United States Patent

Bacher et al.

[11] Patent Number: 5,988,865
[45] Date of Patent: Nov. 23, 1999

[54] DEVICE FOR PREPARING THERMOPLASTIC MATERIAL

[76] Inventors: Helmut Bacher, Bruck/Hausleiten 17; Helmuth Schulz, Badstrasse 20, both of St. Florian A-4490, Austria; Georg Wendelin, Waldbothenweg 84, Linz A-4033, Austria

[21] Appl. No.: 08/894,902
[22] PCT Filed: Mar. 19, 1996
[86] PCT No.: PCT/AT96/00053
§ 371 Date: Sep. 2, 1997
§ 102(e) Date: Sep. 2, 1997
[87] PCT Pub. No.: WO96/32242
PCT Pub. Date: Oct. 17, 1996

[30] Foreign Application Priority Data

Apr. 11, 1995 [AT] Austria ................................ 628/95

[51] Int. Cl.⁶ .................................................. B29B 7/60
[52] U.S. Cl. .......................................................... 366/76.93
[58] Field of Search ........................... 366/76.1, 76.9, 366/76.92, 76.93, 80, 81, 82, 98, 99

[56] References Cited

U.S. PATENT DOCUMENTS

| | | | |
|---|---|---|---|
| 3,228,065 | 1/1966 | Cournoyer et al. | 366/76.91 |
| 4,058,298 | 11/1977 | Duska et al. | 366/76.1 |
| 4,195,934 | 4/1980 | Spanier | 366/96.92 |
| 4,494,877 | 1/1985 | Upmeier et al. | 366/76.93 |
| 5,096,302 | 3/1992 | Durina | 366/76.92 |
| 5,683,632 | 11/1997 | Shimizu et al. | 366/76.1 |

FOREIGN PATENT DOCUMENTS

| | | |
|---|---|---|
| 0 071 159 | 2/1983 | European Pat. Off. . |
| 0 100 945 | 9/1984 | European Pat. Off. . |
| 0 303 929 | 2/1989 | European Pat. Off. . |
| 1271973 | 7/1968 | Germany . |
| 21 12 306 | 9/1972 | Germany . |
| 23 51 328 | 4/1975 | Germany . |
| WO 88 02684 | 4/1988 | WIPO . |
| WO 95 17293 | 6/1995 | WIPO . |

*Primary Examiner*—Tony G. Soohoo
*Attorney, Agent, or Firm*—Salter & Michaelson

[57] ABSTRACT

An apparatus for reprocessing thermoplastic synthetic plastic material has a receptacle (1) for accomodating the synthetic plastic material, in which receptacle (1) has a rotating tool (4) is provided which presses the synthetic plastic material out of the receptacle (1) into the inlet opening (11) in the side wall of the screw housing (12) of a screw (13). The screw housing (12) of the screw (13) has a pocket-like enlargement (22) in the area of the inlet opening (11), which enlargement (22) provides an additional space for the synthetic plastic material being pressed in. On that edge of the inlet opening (11) on which the direction of rotation of the screw (13) is directed towards the receptacle (1), this enlargement (22) is confined by an adjustable wall piece (23). The enlargement (22) gives way in an area of the screw housing (12) adjoining it to grooves (28), which are of a depth which decreases to the screw diameter and which are separated from each by the rigid ribs (29) projecting toward the screw (13) from the wall of the enlargement (22). Each of these grooves (28) forms a space for the synthetic plastic material, the longitudinal direction of which space runs essentially in the axial direction of the screw (13).

21 Claims, 3 Drawing Sheets

DEVICE FOR PREPARING THERMOPLASTIC MATERIAL

BACKGROUND OF THE INVENTION

The invention refers to an apparatus for reprocessing thermoplastic synthetic plastic material, comprising a receptacle for the synthetic plastic material to be processed, which receptacle has a device with at least one rotating tool which conveys the synthetic plastic material through a discharge opening of the receptacle such that a component of stuffing force is exerted on the synthetic plastic material in the axial direction of this discharge opening and transmitted thereto always by the synthetic plastic material subsequently being pressed in, which discharge opening leads to an inlet opening for the synthetic plastic material arranged in the side wall of the screw housing, whereby the interior surface of the housing of the screw in the area of the inlet opening has a pocket-like enlargement which provides an additional space to accomodate synthetic plastic material and which is bound by an adjustable wall piece on that edge of the inlet opening on which the direction of rotation of the screw is directed towards the receptacle, which wall piece allows the enlargement to be at least partially closed off from the receptacle.

A device of this kind is the subject matter of an older, not previously published construction by the present applicants. This construction has the advantage that even synthetic plastic materials possessing different properties can be reliably engaged by the screw since the stuffing action of the rotating tool continuously ensures that sufficient synthetic plastic material is pressed from the side between the individual flights of the screw rotating around its longitudinal axis. Although this in itself poses the risk that the conveying efficiency of the screw becomes too great and causes overloading of the screw drive, this risk can be avoided by drawing back the adjustable wall piece in relation to the screw such that part of the synthetic plastic material engaged by the screw is returned to the receptacle. In this way it is possible to adjust the conveying efficiency of the screw to the prevailing conditions.

SUMMARY OF THE INVENTION

The object of this invention is to further improve such an apparatus, particularly with regard to the feeding of loose materials into the screw housing and with regard to manufacturing costs. The aforementioned older construction, namely, has other wall pieces in the area of the inlet opening of the screw housing aside from the one mentioned above, some of which can be adjustable if required, and experience has shown that the area of the screw housing with the inlet opening is expensive to manufacture since its manufacture requires metal removal. The invention now improves the aforementioned apparatus with regard to the feeding of loose materials into the screw housing and with regard to the manufacturing costs by having the enlargement give way to several grooves at least in the area of the screw housing adjoining it in the transport direction of the screw, which grooves are of a depth which decreases to the screw diameter in this area and which grooves are separated from each other in this area by rigid ribs projecting toward the screw relative to the wall of the screw housing enlargement, each of these grooves providing a space for the synthetic plastic material, the longitudinal direction of which space having a substantial component extending in the axial direction of the screw housing.

The ribs confining the individual grooves create forces of resistance in the area of the inlet opening of the screw housing for the synthetic plastic material engaged by the screw, which forces prevent the said synthetic plastic material from merely rotating along with the screw without being transported further to any substantial degree in the axial direction of the screw. Owing to the fact that the ribs of the older construction mentioned initially now no longer all have to be placed in the area of the inlet opening for the synthetic plastic material, the machining of the screw housing section with the inlet opening is simplified. Although in extreme cases the ribs bounding the grooves may project into the area of the inlet opening, they do not extend along its entire length as measured in the axial direction of the screw. Therefore, even in such a case, the grooves can be made on machines with only a limited machining range.

To provide grooves placed in the area of the inlet opening of a screw housing and in an area of it adjoining the said area in the axial direction of the screw is known (DE-A 2 351 328). However, there, the grooves form further recesses of the enlargement of the screw housing so that the ribs remaining between the grooves do not project from the wall of the enlargement toward the screw. An arrangement of this kind would therefore work less than ideally in the apparatus in accordance with the invention.

In the scope of the invention, a preferred embodiment is to have the ribs extend in the radial direction of the screw housing to the periphery of the screw flights. Thereby it is most effectively prevented that synthetic plastic material stuffed into the inlet opening and engaged by the screw merely rotates along with the screw without being transported in the direction of the axis.

Preferably, in accordance with a further variant of the invention, the grooves are provided for only in one area of the screw housing adjoining the inlet opening and therefore do not extend into the area of the inlet opening. This substantially simplifies the manufacture of the latter area and makes it possible, in accordance with a preferred embodiment of the invention, to have the grooves in a sleeve forming a separate section of the screw housing, which sleeve is installed into the rest of the screw housing such that it is non-rotatable, and preferably, easily exchangeable. This very effectively takes into account that the structural elements which prevent the synthetic plastic material engaged by the screw from merely turning along with it, that is the ribs, are subject to extreme wear when processing synthetic plastic material containing abrasive contaminants, especially waste material. Such a separate sleeve is a cost-effective solution to this problem, especially if it is easily exchangeable. Otherwise, if the ribs confining the pockets or the grooves became worn to a degree no longer deemed acceptable, the entire feed section of the screw housing would have to be replaced at great expense. Although a separate sleeve comprising the grooves or the ribs confining the grooves is also subject to extreme wear, however this sleeve can be manufactured relatively cost-effectively due to its simple geometric features and thus constitutes a wearing part which is exchanged as required. Owing to its simplicity of manufacture, the sleeve can also be made of a wear-resistant material, especially of hard metal.

In accordance with a further variant of the invention, provision is made in the area of the inlet opening for only one single pocket-like enlargement, preferably with a constant depth, which extends around the entire circumference of the screw with the exception of the inlet opening and which then continues in the form of several grooves. Tests have shown, namely, that the conveying efficiency of the screw can be sufficiently regulated if only a single, adjustable outermost rib is placed directly next to the inlet opening. This arrangement further simplifies the manufacture of the screw housing section with the inlet opening.

In operation, the synthetic plastic material engaged by the screw is pressed in gradually between the screw flights due to the decreasing depth of the grooves. Preferably, the arrangement here should be such that the depth of the grooves continuously decreases in the direction of transport of the screw in order to prevent blockages of the material, and preferably, the bottom of at least one groove is shaped like the surface of the envelope of a cone.

In the scope of the invention, it is recommended that the length of the grooves as measured in the axial direction of the screw be dimensioned shorter than the width of inlet opening as measured in the same direction, and, preferably, the groove length measured in this way should be 0.5 to 3 times the screw diameter. The shorter the grooves, especially in a separate housing section, the simpler it will be to manufacture this component.

BRIEF DESCRIPTION OF THE FIGURES

In the drawing examplative embodiments of the subject matter of the invention are schematically shown.

DETAILED DESCRIPTION OF THE INVENTION

Figure 1:
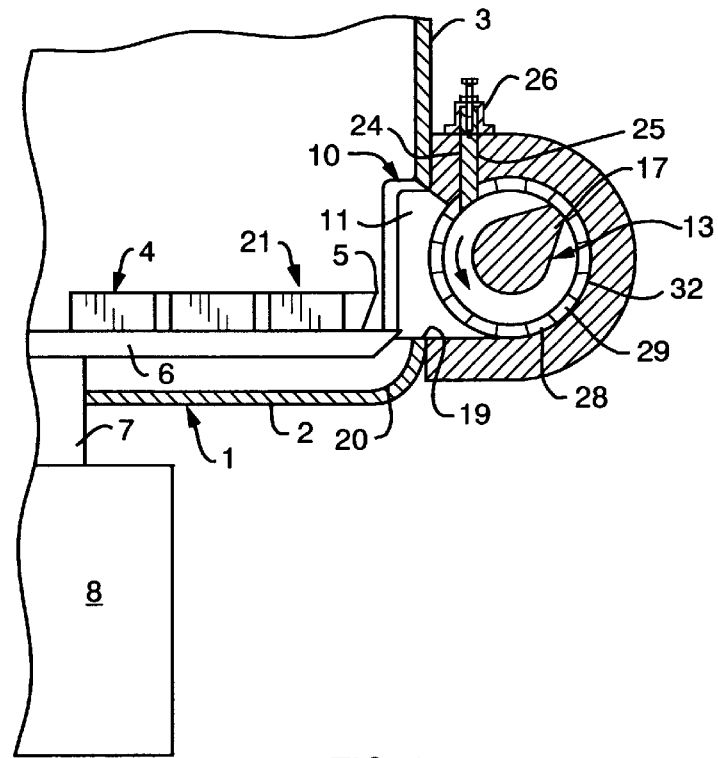
FIG. 1 shows a first embodiment in a vertical section taken along the line I—I of FIG. 2.
Figure 2:
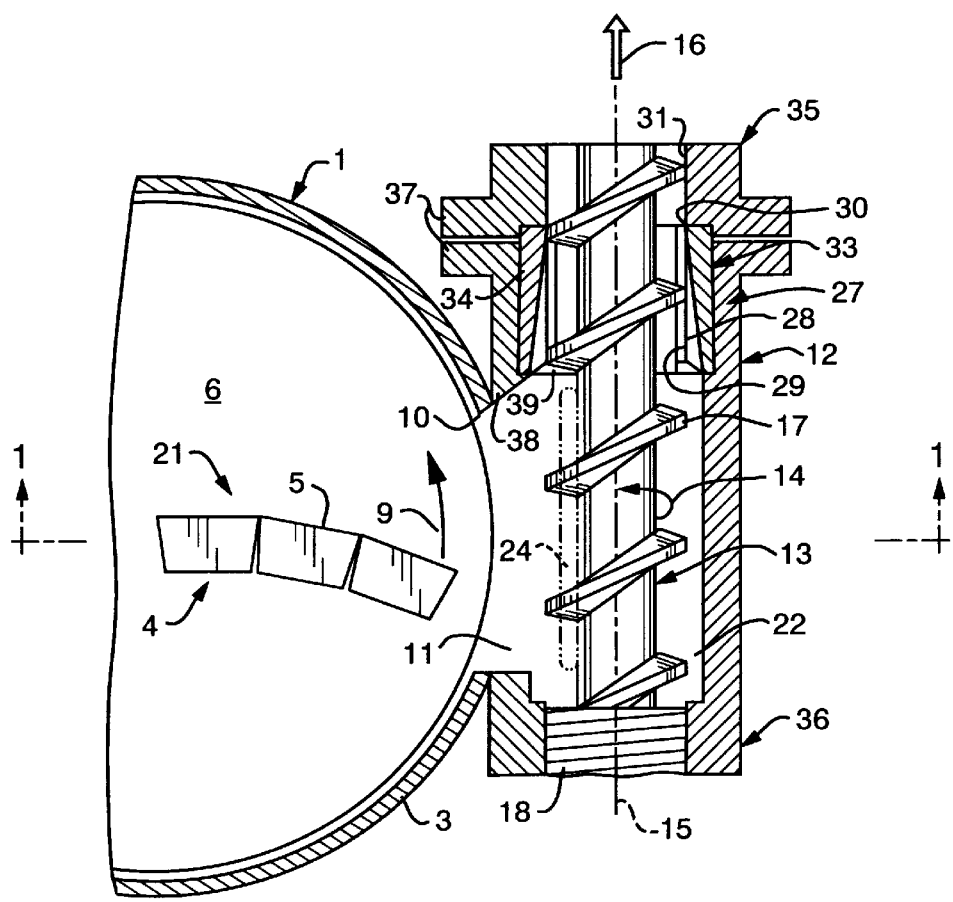
FIG. 2 illustrates a horizontal section to FIG. 1 at the height of the screw axis.

In the embodiment shown in FIGS. 1 and 2, a receptacle 1 is provided for to hold the synthetic plastic material to be processed, which synthetic plastic material generally consists of thermoplastic waste material of all kinds. The receptacle has a bottom 2 and side walls 3. The synthetic plastic material is fed into the receptacle 1 from the top through a feeding device not shown, if need be, after being pretreated, e.g. cleaned or freed of coarse contaminants, e.g. stones or metal parts. In the receptacle 1, the synthetic plastic material is treated by at least one rotating tool 4, which in this form of execution has sharp operating edges 5 which act on the synthetic plastic material and are preferably formed by bent blades, so that the synthetic plastic material is comminuted and/or mixed during the rotation of tool 4. The synthetic plastic material is reduced in size if it is supplied in form of larger elements (sheets, bottles, etc.) and it is mixed if it is already processed into particle form (e.g. granules). In most cases, thereby the synthetic plastic material is also heated, making it easier to plasticize later on. The tools 4 are mounted on a rotor disk 6, arranged just above the bottom 2 and driven for rotational movement in the direction of the arrow 9 (FIG. 2) by a motor 8 via a shaft 7, which intersects the bottom 2.

In the side wall 3, the receptacle 1 has a discharge opening 10, which is connected—if need be by means of a short tube—to an inlet opening 11 of the housing 12 of a screw 13. The screw is driven by a drive means, not shown, in the direction of the arrow 14 to rotate around its longitudinal axis 15 and conveys the synthetic plastic material engaged by it in the direction of the arrow 16. If the screw 13 is not merely a conveying screw, but a screw which conveys the material to an extruder head, the synthetic plastic material is plasticized. The volutions of the screw 13 extend beyond the inlet opening 11, when seen opposite the direction 16 of transport, and give way there to a thread 18 which acts as a seal, the pitch of which thread has the same direction as that of the screw flights 17 and which, for the sake of expediency, has narrower flights. The screw 13 or its housing 12 can be fitted with a heater and/or with a cooler in order to be able to keep the synthetic plastic material being conveyed at the desired temperature.

The substantially rectangular inlet opening 11, which is located on the side wall of the housing 12 of the screw 13, is dimensioned to be relatively large; it extends in the direction of the axis of the screw 13 over about two flights 17 in the embodiment shown here and, in any case, over at least half of a flight. The height of the inlet opening 11, as measured in the direction of the axis of the receptacle 1, is about as large as the diameter of the screw flights 17. This ensures that the screw 13 can take in the incoming synthetic plastic material from receptacle 1 in large quantities. The housing 12 of the screw 13 is attached substantially tangentially to the side wall 3 of the receptacle 1 such that—as seen in the direction of the screw axis 15—the circumference of the screw 13 is somewhat further away from the center of the receptacle 1 than the interior surface of the wall 3 (FIG. 1) or more or less flush with the latter. The wall of the housing 12 continues in the form of a horizontal section to the bottom edge 19 of the inlet opening 11, where it connects with a curved wall section 20 which leads to the bottom 2 of the receptacle 1. The bottom edge 19 of the inlet opening 11 is at about the same height as the upper surface of the rotor disk 6. The synthetic plastic material is therefore pressed by a feeder device 21 from the side between the flights 17 of the screw 13. This way of introducing the synthetic plastic material into the screw housing 12 guarantees an especially favorable overall design, a point which will be elaborated on below.

The rotating tools 4 in the receptacle 1 constitute a feeder device 21 which presses the synthetic plastic material it processes from the discharge opening 10 into the inlet opening 11, doing so, on the one hand, by the exertion of centrifugal force on the rotating synthetic plastic material and on the other, by the blade-type action of the tools 4. As a result of this, a stuffing force is exerted on the synthetic plastic material such that the synthetic plastic material subsequently pressed in, in turn, presses the synthetic plastic material in front of it into the inlet opening 11, this pressure being exerted largely in a direction having a substantial component in direction of the axis of the inlet opening 11, that is perpendicular to the direction of the axis 15 of the screw 13. This, on the one hand, counteracts bridging of the synthetic plastic material in the area of the inlet opening 11, and on the other hand always a sufficient amount of synthetic plastic material is pressed between the individual screw flights 17 so that always an ample supply of synthetic plastic material is supplied to the screw 13, even if this material is only in very loose form, e.g. in form of flakes, foils, chips, etc. To further improve the screw's ability to engage the synthetic plastic material entering the housing 12, a free space is provided for in screw housing 12 in addition to the screw flights 17, which space is formed by a pocket-like enlargement 22 of the screw housing 12. This enlargement 22 takes the form of a hollow cylinder over large sections of the circumference of the screw housing 12 and extends in the direction of the axis of the screw 13 over at least one screw flight 17, in the embodiment shown over approx. 2.5 screw flights (FIG. 2). The enlargement 22 is directly connected to the inlet opening 11. The width of the enlargement 22, as measured in the direction of the circumference of the screw 13, is preferably constant along its entire length so that the pocket formed by the enlargement 22 has essentially the same depth throughout. The enlargement 22 directly adjoins the sealing thread 18 and extends beyond both sides of the inlet opening 11 in the direction of the axis of the screw 13. The depth of the enlargement 22, as measured radially from the screw 13, is about 5 to 10% of the diameter of the screw 13. At the bottom edge 19 of the inlet opening 11, the enlargement 22 gives way steplessly to the inlet opening 11 (FIG. 1), forming at this point essentially a horizontal continuation of the upper surface of the rotor disk 6. By contrast, at the upper edge of the inlet opening 11, that is the edge of the inlet opening 11 at which the screw 13 rotates in direction towards the receptacle 1 (arrow 14), the enlargement has an adjustable wall piece 23 which consists of a rib 24 which is guided in a guiding slot 25 of the screw housing 12 and can be continuously adjusted by means of adjusting devices 26, e.g. adjusting screws, to be closer to the screw 13 or further away from it. For the sake of expediency, the adjustment range covers the entire depth of the pocket 22. The front face of the rib 24 opposite the screw 13 is, for the sake of expediency, shaped to correspond with the circumference of the enlargement 22. In its completely retracted position, the rib 24 therefore constitutes a smooth continuation of the exterior wall of the pocket-like enlargement 22 so that the rib 24 creates no resistance to the synthetic plastic material engaged by the screw 13. By contrast, when in its front-most position toward the screw 13, the rib 24 contacts with its front face the circumference of the flights 17 of the screw 13 and therefore exerts considerable resistance against the synthetic plastic material engaged by the screw 13. In this latter position, the rib 24 closes off the pocket-like enlargement 22 at least partially from the interior of the receptacle 1 so that the synthetic plastic material in the pocket-like enlargement 22 is continuously pressed between the flights 17 of the screw 13 and therefore cannot merely rotate along with the screw 13 but rather is transported in the direction of the axis of the screw. By contrast, when the rib 24 is in its retracted position, a part of the synthetic plastic material engaged by the screw 13 in the inlet opening 11 is conveyed back into the inlet opening 11, thus reducing the conveyance performance of the screw 13 in the direction of the arrow 16. If intermediate positions of the rib 24 are selected, the conveying efficiency of the screw 13 can be set as desired between maximum and minimum and therefore adjusted to meet prevailing conditions. This is especially of advantage when the nature of the synthetic plastic material is variable, e.g. of varying density, since it prevents overloads of the screw 13 and its drive means. Directly adjoining the pocket-like enlargement 22 there is an area 27 of the housing 12 which has several grooves 28 on its interior surface, which grooves 28 are separated from each other by rigid and unmoving ribs 29 projecting from the periphery wall of this area 27. The grooves 28 and the ribs 29 run in the direction 16 of the screw axis 15 in the embodiment shown, but they can also be wound helically around this axis 15, however, they must always have a substantial component of their longitudinal direction, which is directed in the direction of the screw axis 15. The ribs 29 are of such a height that their surfaces facing the screw 13 rest on the periphery of the screw flights 17 and therefore practically form a support for the screw 13 in the area 27. The depth of the grooves 28 decreases the further away from the pocket-like enlargement 22 they are, preferably continuously and steplessly. The arrangement in the embodiment shown is such that the depth of the grooves 28 at the end at which the conveyed synthetic plastic material enters is the same depth as that of the enlargement 22 so that no step is created at the transition from the enlargement 22 to the grooves 28, however, each rib 29 does form such a step. On the other front face of the area 27, there is a smooth transition between the grooves 28 and the outer diameter of the screw, that is the bottom of the grooves 28 reaches the top of the ribs 29. For this reason, on this front face 30 (FIG. 2), the grooves 28 and the ribs 29 give way, steplessly for the sake of expediency, to the cylindrical wall 31 of the screw housing 12.

Suitably, the side walls of the grooves 28 extend such that the synthetic plastic material being transported by the screw 13 catches on them. Preferably, to this end, that side wall of each successive groove 28—as seen in the direction of rotation of the screw 13 (arrow 14)—should be inclined opposite the direction of rotation of the screw. The ribs 29 between the grooves 28 therefore have a more or less trapezoidal cross section. The grooves 28 need not all be equal in width, although this would simplify the manufacturing process. The same is true of the ribs 29. For the sake of expediency, the ratio of the width of the grooves 28 to the width of the ribs 29, as seen in the direction of rotation of the screw 13 (arrow 14), should be 0.5:1 to 2:1. In the embodiment shown (FIG. 1), this ratio is about 1:1. The bottom 32 of each groove 28 can be shaped like the envelope of a cone but a flat bottom 32 is also possible.

To simplify manufacturing, the grooves 28 and the ribs 29 are substantially shorter than the length of the enlargement 22 as measured in the direction of the axis of the screw 13 and also shorter than the extent of the inlet opening 11 as measured in the same direction. Suitably, the ratios between the above lengths of the enlargement 22 to that of the grooves 28 as measured in the indicated direction should be 3:1 to 1.5:1; for the sake of expediency, about 2:1. It is particularly advantageous here if a provision can be made to have the grooves 28 be in a separate section of the screw housing 12, which section is executed as an easily exchangeable sleeve 32 (FIG. 2). This sleeve 33 is inserted into a cylindrical recess 34 of the screw housing 12 and is attached there so that it cannot turn, e.g. by means of a wedge, not shown, or a similar device. To ensure the easy replacement of this sleeve 33, which is a wearing part and which, for the sake of expediency, is made of wear-resistant material, especially hard metal, the sleeve 33 is located between two sections 35 and 36 of the screw housing 12 which are screwed together at flanges 37. The aforementioned precaution against the sleeve 33 turning can also be undertaken by putting projections on the front face on the downstream side, e.g. toothing, claws, or the like, which projections then engage in corresponding recesses of the screw housing section 35. The relatively short axial length of the sleeve 33 makes it easy to manufacture so that this part subject to such heavy loading can be exchanged very cost-efficiently.

The edge of the inlet opening 11 on the downstream side is executed as an inclined surface 38 (FIG. 2), preferably conical, and there is a smooth transition between it and the front face of the ribs 29 or the grooves 28, respectively. As FIG. 2 indicates, the front face 39 of the ribs 29 on the upstream side can be inclined, preferably conical, whereby this inclination can be flush with the inclined surface 38 of the inlet opening 11. This enhances the catching of synthetic plastic material in the pocket-like enlargement 22 for the purpose of being conveyed by the screw 13 in the direction of the arrow 16.

In operation, the rotational movement of the tools 4 causes the synthetic plastic material to be pressed by centrifugal force, supported by the blade-like action of the angle-bent tools 4, into the discharge opening 10 of the receptacle 1 and through this opening into the inlet opening 11 of the screw housing 12. The synthetic plastic material being stuffed in in this way enters between the individual flights 17 of the screw 13 and into the pocket-like enlargement 22 and fills in these spaces. Through the turning of the screw 13, the synthetic plastic material is carried along and pressed into the grooves 28 of the sleeve 33. The rib 24 assists this pressing of the synthetic plastic material into the grooves 28 to varying degrees depending on how far the rib 24 projects upward from the bottom of the enlargement 22. Due to the decreasing depth of the grooves 28 and the thrust exerted by the synthetic plastic material subsequently being fed in, the synthetic plastic material is by and by pressed between the screw flights 17 of the screw 13 until it is completely between the screw flights 17 in the section 35 of the screw housing 12. Due to this pressing in of synthetic plastic material, the screw 13 achieves a high degree of conveying efficiency which can bring it to the limits of its loadabilty. If this limit is close to being reached, the conveying efficiency of the screw 13 can be reduced by retracting the rib 24 since this causes part of the synthetic plastic material carried along by the screw in the enlargement 22 in the direction of arrow 14 to be conveyed back into the inlet opening 11. To be especially effective, the length of the rib 24, as measured in the direction of the axis of the screw 13, extends at least over the width of the inlet opening 11, as measured in the same direction (FIG. 2).

In order to better absorb the stuffing pressure exerted by the synthetic plastic material on the screw 13 and also the bending load exerted by solids on the screw 13, at least one additional longitudinal rib can be provided in the pocket-like enlargement 22, which rib acts as a support for the screw 13 and, if need be, can be adjustable, as with the rib 24. However, it is preferable to have only one single pocket-like enlargement 22 since one is usually enough and having just one simplifies the manufacture of the feed section of the screw housing 12.

Figure 3:
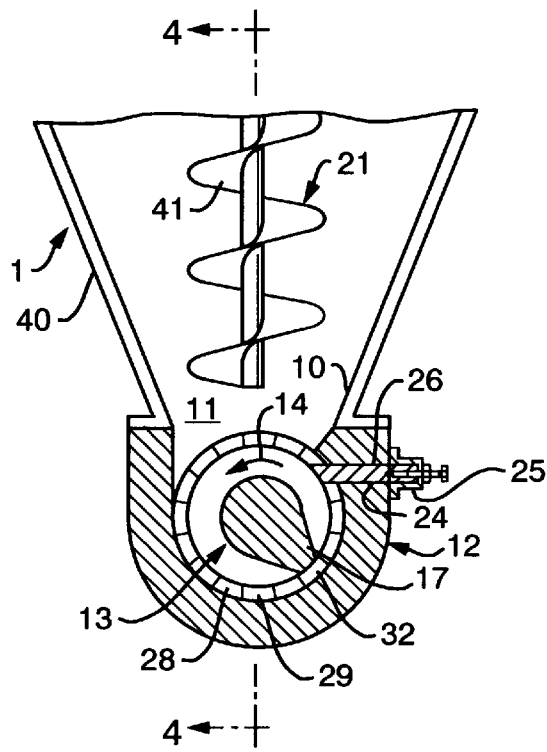
FIG. 3 illustrates a further embodiment in a vertical section taken perpendicularly to the screw axis and FIG. 4 is a section taken along Line IV—IV of FIG. 3.
Figure 4:
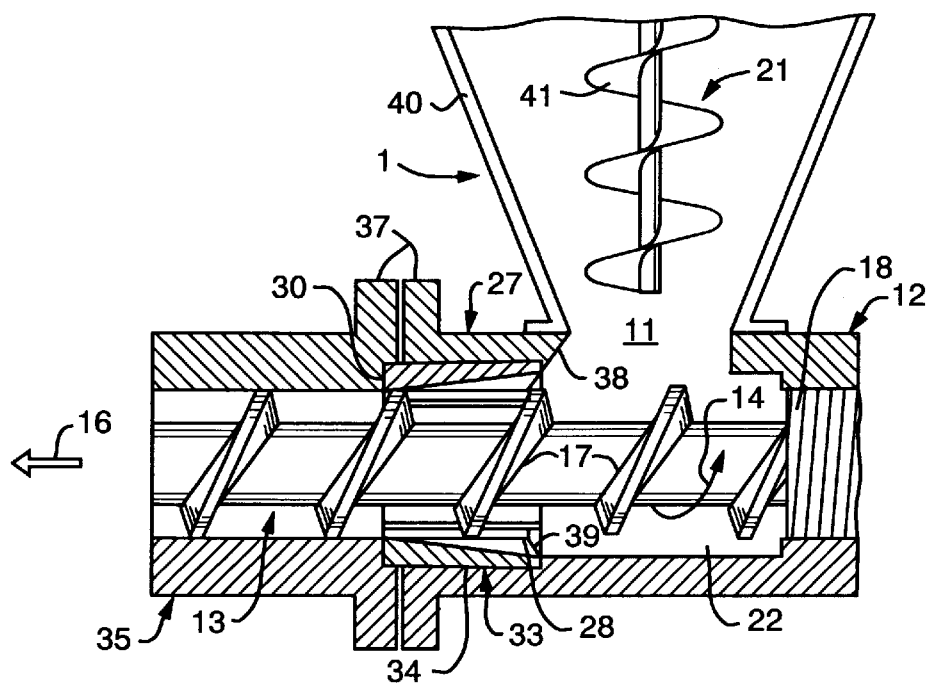
Figure 5:
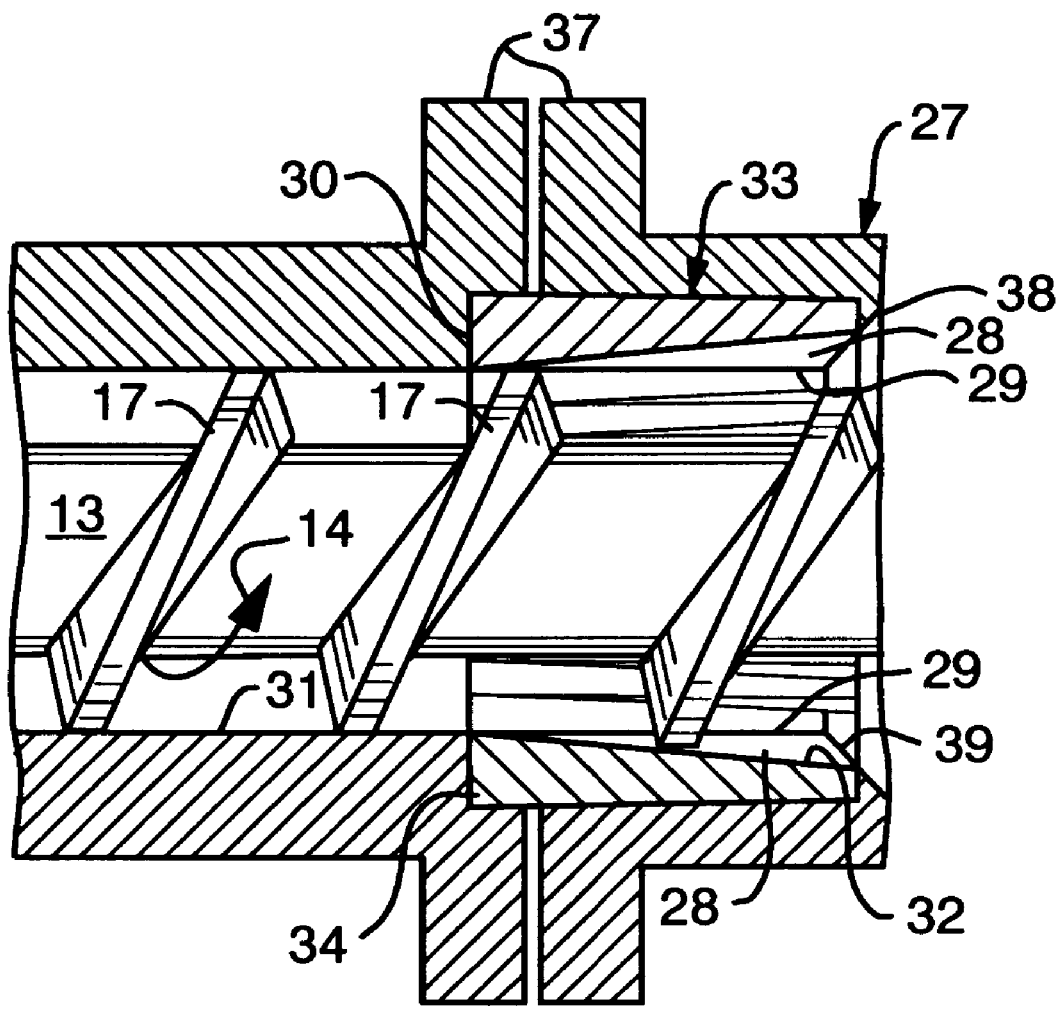
FIG. 5 shows in a larger scale a somewhat modified form of execution of an exchangeable sleeve with grooves.

The adjustable wall piece 23 need not necessarily be executed as a rib 24, because a wall piece 23 can also be provided for, which can be swiveled in relation to the rest of the wall of the pocket-like enlargement 22 such that the pivotal point is on the feed side. In this way, the synthetic plastic material carried along by the screw 13 can be more gradually pressed into the screw flights and not so suddenly as is the case with the rib 24. In terms of design, however, the rib 24 is much simpler and is therefore the preferred embodiment. 10 The embodiment variant shown in FIGS. 3 to 5 differs from that shown in FIGS. 1 and 2 substantially only by the way in which the synthetic plastic material is supplied into the inlet opening 11 of the screw housing 12. For this purpose, a hopper 40 is connected to the upward facing inlet opening 11 of the screw housing 12, which hopper constitutes the receptacle 1 for the synthetic plastic material, and which hopper contains a screw 41 as a feed unit 21, which rotates, thus exerting the necessary stuffing action on the synthetic plastic material located in the hopper 40. In this embodiment the width of the inlet opening 11, as measured in the direction of the axis of the screw 13, is dimensioned just slightly larger than the screw flight height and the length of the sleeve 33, as measured in the same direction, is approximately the same size as the width of the inlet opening 11. As illustrated in FIG. 5, the sleeve 33 can also be executed to be shorter, thus increasing the steepness of the groove bottom 32 formed in the shape of the envelope of a cone.

The tangential connection of the screw housing 12 to the receptacle 1 makes it possible to arrange the drive means for the screw 13 on one end of the latter and an extruder head, or the like, on the other end so that the synthetic plastic material can be extruded by the screw 13 without the need for a deviation. This ensures an especially high degree of efficiency.

We claim:

1. An apparatus for reprocessing thermoplastic synthetic plastic material, comprising a receptacle for the synthetic plastic material to be processed, said receptacle having at least one rotating tool which conveys the synthetic plastic material through a discharge opening of the receptacle such that a component of a stuffing force is exerted on the synthetic plastic material in the axial direction of this discharging opening and transmitted thereto always by synthetic plastic material subsequently being pressed in, said discharge opening leading to an inlet opening for the synthetic plastic material arranged in a side wall of a screw housing of a screw, whereby the interior surface of said screw housing of the screw in the area of the inlet opening has a pocket-like enlargement, which provides an additional space to accommodate synthetic plastic material and which is confined by an adjustable wall piece on that edge of the inlet opening on which the direction of rotation of the screw is directed towards the receptacle said wall piece allowing the enlargement to be at least partially closed off from the receptacle whereby the enlargement gives way to several grooves at least in the area of the screw housing adjoining it in the transport direction of the screw and whereby said grooves are of a depth which decreases to the screw diameter in this area and in which the grooves are separated from each other in this area by rigid ribs projecting toward the screw relative to the wall of the enlargement of the screw housing, each of these grooves providing a space for the synthetic plastic material, the longitudinal direction of which space having a substantial component extending in the axial direction of the screw.

2. Apparatus according to claim 1, wherein the ribs extend in radial direction of the screw housing to the circumference of the screw flights.

3. Apparatus according to claim 1 wherein the grooves are provided only in an area of the screw housing adjoining the inlet opening.

4. Apparatus according to claim 1, wherein the area of the inlet opening only one single pocket-like enlargement is provided, which extends around the entire circumference of the screw with the exception of the inlet opening and which continues in form of several grooves.

5. The apparatus according to claim 4 wherein the one single pocket-like enlargement has a constant depth.

6. Apparatus according to claim 1, wherein the depth of the grooves continuously decreases in direction of transport of the screw.

7. The apparatus according to claim 6 wherein the bottom of at least one groove is shaped like the surface of the envelope of a cone.

8. Apparatus according to claim 1, wherein the length of the grooves as measured in the axial direction of the screw is shorter than the width of the inlet opening as measured in the same direction.

9. The apparatus according to claim 8 wherein the length of the groves is 0.5 to 3 times the screw diameter.

10. Apparatus according to claim 1, wherein the grooves have the same width, as measured in the direction of the circumference of the screw.

11. Apparatus according to claim 1, wherein the ribs have the same width, as measured in the direction of the circumference of the screw.

12. Apparatus according to claim 1, wherein the ratio of the width of the grooves to the width of the ribs, as measured in the direction of the circumference of the screw, is 0.5:1 to 2:1.

13. The apparatus according to claim 12 wherein said ratio is about 1:1.

14. Apparatus according to claim 1, wherein the ribs and the grooves run in the longitudinal direction of the screw.

15. Apparatus according to claim 1, wherein the grooves are provided in a separate section of the screw housing, which section is executed as a sleeve installed in the remainder of the screw housing such that it cannot turn.

16. Apparatus according to claim 15, wherein the sleeve is made of wear-resistant material.

17. The apparatus according to claim 15 wherein the sleeve is detachable from the screw housing such that it is easy to exchange.

18. Apparatus according to claim 1, wherein the enlargement has a constant depth in the direction of the circumference of the screw.

19. Apparatus according to claim 1, wherein the edge of the inlet opening is executed as an inclined surface which gives way to the area of the screw housing adjoining the enlargement.

20. The apparatus according to claim 19 wherein the inclided surace is conical.

21. Apparatus according to claim 1, wherein the adjustable wall piece is formed by a rib, the adjustment range of which is as large as the depth of the pocket-like enlargement.

* * * * *